March 29, 1949.  M. YUNGER  2,465,778
MEASURING DEVICE
Filed May 20, 1946
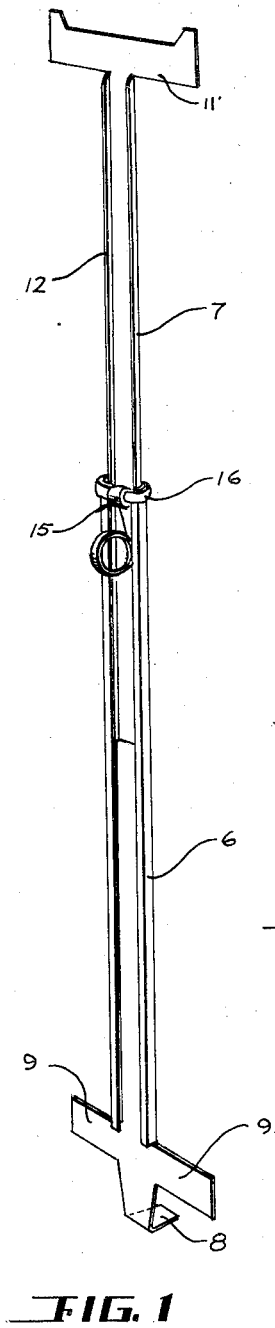
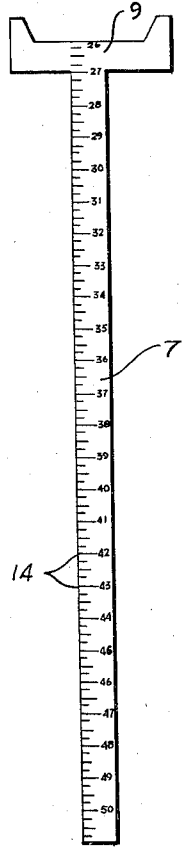
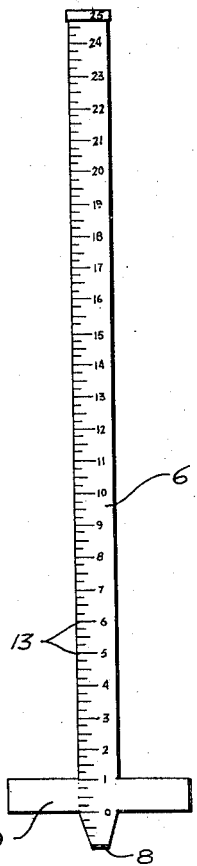
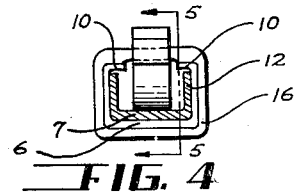
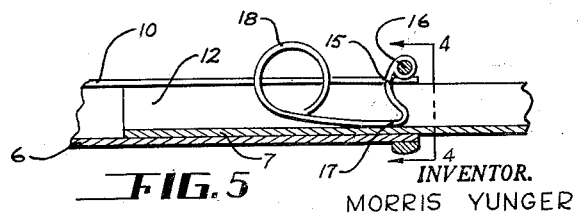
INVENTOR.
MORRIS YUNGER
BY
ATTORNEY Patented Mar. 29, 1949

2,465,778

UNITED STATES PATENT OFFICE 2,465,778

MEASURING DEVICE

Morris Yunger, Dayton, Ohio

Application May 20, 1946, Serial No. 670,864

1 Claim. (Cl. 33—8)

This invention relates to a measuring device and more particularly to a device for determining the required length of trouser legs.

One object of the invention is to provide a measuring device by which the required length of trouser legs may be determined without the hand of the person taking the measurement coming in contact with the person being measured.

A further object of the invention is to provide a measuring device by which persons may easily and accurately measure themselves for trouser leg length.

A further object of the invention is to provide a measuring device which can be quickly and accurately adjusted to indicate the required length of trouser legs and then positively locked in adjusted position.

A further object of the invention is to provide a measuring device on which the graduations are so arranged that the measured length may be instantly determined without computation.

A further object of the invention is to provide such a measuring device which is of strong durable construction, of light weight and inexpensive to manufacture.

Other objects of the invention may appear as the device is described in detail.

In the accompanying drawings Fig. 1 is a perspective view of a measuring device embodying the invention; Fig. 2 is a front elevation of the adjustable member of such a device; Fig. 3 is a front elevation of the lower member of such a device; Fig. 4 is a transverse section taken on the line 4—4 on Fig. 5; and Fig. 5 is a section taken through a portion of the device on the line 5—5 on Fig. 4.

In the accompanying drawings I have illustrated a preferred embodiment of my invention, but it is to be understood that the device as a whole, as well as the various parts thereof, may take various forms without departing from the spirit of the invention.

In the embodiment here shown the measuring device comprises an elongate lower member 6 adapted to be supported on the floor, and an elongate upper member 7 slidably supported on the lower member.

The members may take various forms, but in the present instance the lower member is provided at its lower end with a laterally extending part 8 constituting a floor engaging plate adapted to be engaged by the foot of the person being measured to retain the device in a stationary upright position. The member 6 is also provided, a short distance above the floor engaging end thereof, with parts 9 constituting a transverse member, the lower edge of which is spaced from the floor a distance corresponding to the desired distance between the lower ends of the trouser legs and the floor. That portion of the lower member which extends above the cross member 9 is provided with vertical guideways, and in the present instance this member is channel shaped in form and the rear edges of the side walls thereof are bent inwardly to form flanges 10. The upper member 7 is provided at its upper end with a transverse part 11 constituting a crotch engaging member adapted to be positioned in the crotch of the person being measured and thus locate it at the upper ends of the inside seams of the trouser legs. The upper member is slidably supported in the guideways of the lower member 6. Preferably, but not necessarily, this upper member is also channel shaped to stiffen the same, the side walls 12 of the channel being of less depth than the channel of the lower member so that the upper member will slide freely in the lower member and will be held against tilting movement with relation thereto.

The device is provided with graduations to indicate the adjusted length of the device. As here shown the lower member 6 is provided with a longitudinal series of graduations 13 preferably in inches and fractions thereof. The effective length of the lower member is from the lower edge of the transverse member 9 to the top of the lower member, and the graduations are numbered from this lower edge of the member 9 consecutively to the top of the member 6. It is not essential that the lower member should be provided with graduations as it is of a known predetermined effective length less than the length of any ordinary measurement. In the present instance its effective length, that is, the length from the lower edge of the member 9 to the top of the member 6 is 25 inches. The upper member 7 is also provided with a longitudinal series of graduations 14, and these graduations are numbered consecutively from the top of that member downwardly, and in the present instance extend to the lower end of the upper member. Thus in any adjusted position of the upper member with relation to the lower member that graduation on the upper member which is in line with or close to the upper end of the lower member represents the effective length of the lower member plus the distance which the upper member extends above the upper end of the lower member. This reading represents the true measurement which can be ascertained at a glance without mental computation of any kind.

Suitable means are provided for securing the upper member in adjusted positions with relation to the lower member. This means is preferably of such a character that it can be quickly and easily manipulated to positively lock the upper member in its adjusted position. It is here shown as a lever 15 pivotally mounted on the lower member 6 adjacent the upper end of the latter. In the present instance it is mounted on a band 16 extending about and rigidly secured to the upper end portion of the lower member. The lever is provided between its ends with a cam shaped portion 17 which is movable into and out of the channeled lower member to engage the upper member and clamp the same to the lower member. The lever is provided at its free end with a finger piece 18 which extends outwardly beyond the lower member in all positions of the lever. It will be apparent that when the locking lever is in the position shown in the drawings the cam shaped portion thereof bears tightly against the upper member and that the band 16 holds the upper member against yielding under the pressure of the cam, thus firmly locking the two members together. An outward pull on the free end of the lever swings the cam portion thereof outwardly away from the upper member so as to release the same for adjustment.

When the measurement is to be taken the upper member is moved downwardly either its full length or to a position less than the measurement which is to be made. The device is then placed between the legs of the person to be measured who places his heel on the floor engaging plate 8 and thus retains the device as a whole in a stationary upright position. The upper member is then moved upwardly to properly position the crotch engaging part 11 in the crotch of the person being measured, and the locking lever is then actuated to secure the upper member in its adjusted position. The measurement may be taken either by the person being measured or by another person. When taken by another person it is obvious that it is unnecessary for either hand of the person taking the measurement to come in contact with the person being measured. The locking lever is so positioned that it can be easily moved to locking position by the person being measured without the necessity of bending or other movement which would be liable to displace the upper member with relation to the lower member. When the upper member has been locked in its adjusted position the reading is taken from that graduation which is above or close to the front end of the lower member and this reading represents the exact measurement.

It will be seen, therefore, that the device is very simple both in construction and operation and it is very easily manipulated. The device may be constructed of any suitable material in any suitable manner. As here shown the upper member and the lower member are each formed from a single piece of sheet metal bent to the desired form, thus enabling the device to be produced at low cost and providing a device of light weight.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

A measuring device for determining the required length of trouser legs comprising an elongate lower member channel shape in cross section, the side walls of the channel extending rearwardly and having inwardly extending rear edge portions forming opposed longitudinal guideways, said member having at its lower end a forwardly extending flat floor engaging part to be engaged by the heel of the person being measured, and also having parts extending laterally from the respective edges thereof and fixed with relation thereto with their lower edges spaced a predetermined distance above said forwardly extending part, an elongate upper member slidably supported in the guideways of said lower member and having at its upper end a crotch engaging member, said upper member having on the front surface thereof a longitudinal series of numbered graduations so arranged that the graduations nearest the upper end of said lower member indicates the distance in inches between the upper edge of the crotch engaging member and the lower edges of the laterally extending parts of said lower member, and a releasable locking member mounted on the upper end portion of said lower member and engaging the rear surface of said upper member between the guideways of said lower member.

MORRIS YUNGER.

REFERENCES CITED

The following references are of record in the file of this patent:

UNITED STATES PATENTS

| Number | Name | Date |
| --- | --- | --- |
| 1,225,930 | Craig | May 15, 1917 |
| 1,397,930 | Jeffries | Nov. 25, 1921 |
| 1,951,064 | Richards | Mar. 18, 1934 |
| 2,122,068 | Meyers | June 28, 1938 |
| 2,125,530 | Verdier | Aug. 2, 1938 |
| 2,270,227 | Swanson et al. | Jan. 13, 1942 |